(12) United States Patent
Johnson

(10) Patent No.: US 6,865,336 B2
(45) Date of Patent: Mar. 8, 2005

(54) USER-SPECIFIC TIME VALUES FOR TIME-BASED NAVIGATION FUNCTIONS OF VIDEO RECORDER SYSTEMS

(75) Inventor: Carolynn Rae Johnson, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 192 days.

(21) Appl. No.: 10/376,567

(22) Filed: Feb. 26, 2003

(65) Prior Publication Data

US 2004/0165863 A1 Aug. 26, 2004

(51) Int. Cl.⁷ ............................................... H04N 5/91
(52) U.S. Cl. ............................ 386/83; 386/80; 386/68
(58) Field of Search ......................... 386/80, 68, 69, 386/70, 81, 82, 83, 85, 86, 124, 43, 40, 46, 1, 21; H04N 5/91

(56) References Cited

U.S. PATENT DOCUMENTS 5,377,051 A * 12/1994 Lane et al. ................... 386/81
5,541,738 A * 7/1996 Mankovitz ................... 386/83
5,557,585 A * 9/1996 Hanai et al. .................. 368/43

\* cited by examiner

Primary Examiner—Robert Chevalier
(74) Attorney, Agent, or Firm—Joseph S. Tripoli; Ronald H. Kurdyla; Jeffrey M. Navon

(57) ABSTRACT

There is provided a method for managing time-values of time-based navigation functions in a video recording system. A user input is received that specifies a re-programmed time-value for a time-based navigation function. The re-programmed time-value is stored for future use with the time-based navigation function.

20 Claims, 3 Drawing Sheets

USER-SPECIFIC TIME VALUES FOR TIME-BASED NAVIGATION FUNCTIONS OF VIDEO RECORDER SYSTEMS

BACKGROUND OF THE INVENTION

1. Field of the Invention

The present invention generally relates to video recording systems and, more particularly, to a method and apparatus that allow a user of a video recording system to reprogram the time values associated with time-based navigation functions of the video recording system.

2. Background of the Invention

Personal Video Recording (PVR) systems and Digital Video Recording (DVR) systems allow the user to record programming to a Hard Disk Drive (HDD). The user can rewind recorded programming by pressing a REVERSE button to initiate a reverse mode, or by pressing an INSTANT REPLAY button which instantly rewinds the video and reinitiates playback from a point X seconds in the past. Similarly, the user can fast forward through recorded programming by pressing a FORWARD button to initiate a fast forward mode, or can press a QUICK SKIP button that instantly skips ahead X seconds and reinitiates playback.

However, some users may find the pre-set time values for the INSTANT REPLAY and QUICK SKIP buttons to be unsatisfactory. For example, some users may find the pre-set time values to be too short and, thus, require multiple button presses to allow the user to see the desired video segment in its entirety. Other users may find the pre-set time values to be too long and, thus, result in the user "overshooting" and missing the point in time of interest to the user.

Unfortunately, conventional PVRs do not allow a user to reprogram the time values associated with time-based navigation functions such as, for example, the INSTANT REPLAY and QUICK SKIP buttons. Rather the time values for these buttons are set at the factory and there is no means to allow the user to specify a new desired time value.

Accordingly, it would be desirable and highly advantageous to have a method and apparatus that allow a user of a video recording system to reprogram the time values associated with time-based navigation functions of the video recording system. Such a method and apparatus would afford the user greater flexibility in using the video recording system.

SUMMARY OF THE INVENTION

The problems stated above, as well as other related problems of the prior art, are solved by the present invention, a method and apparatus that allow a user of a video recording system to reprogram the time values associated with time-based navigation functions of the video recording system.

According to an aspect of the present invention, there is provided a method for managing time-values of time-based navigation functions in a video recording system. A user input is received that specifies a re-programmed time-value for a time-based navigation function. The re-programmed time-value is stored for future use with the time-based navigation function.

According to another aspect of the present invention, there is provided an apparatus for managing time-values of time-based navigation functions in a video recording system. A navigation function time-value manager receives a user input that specifies a re-programmed time-value for a time-based navigation function. A memory device stores the re-programmed time-value for future use with the time-based navigation function.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to a method and apparatus that allow a user of a video recording system (e.g., PVR, DVR, and so forth) to reprogram the time-values associated with time-based navigation functions of the video recording system. Thus, for example, the present invention may be used to reprogram, via the User Interface, the INSTANT REPLAY and QUICK SKIP buttons on the remote control, to either lengthen or shorten the time-value associated with each button. It is to be appreciated that while the present invention is described herein with respect to the INSTANT REPLAY and QUICK SKIP functions, the present invention may advantageously be used with any time-based navigation function of a video recording system.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
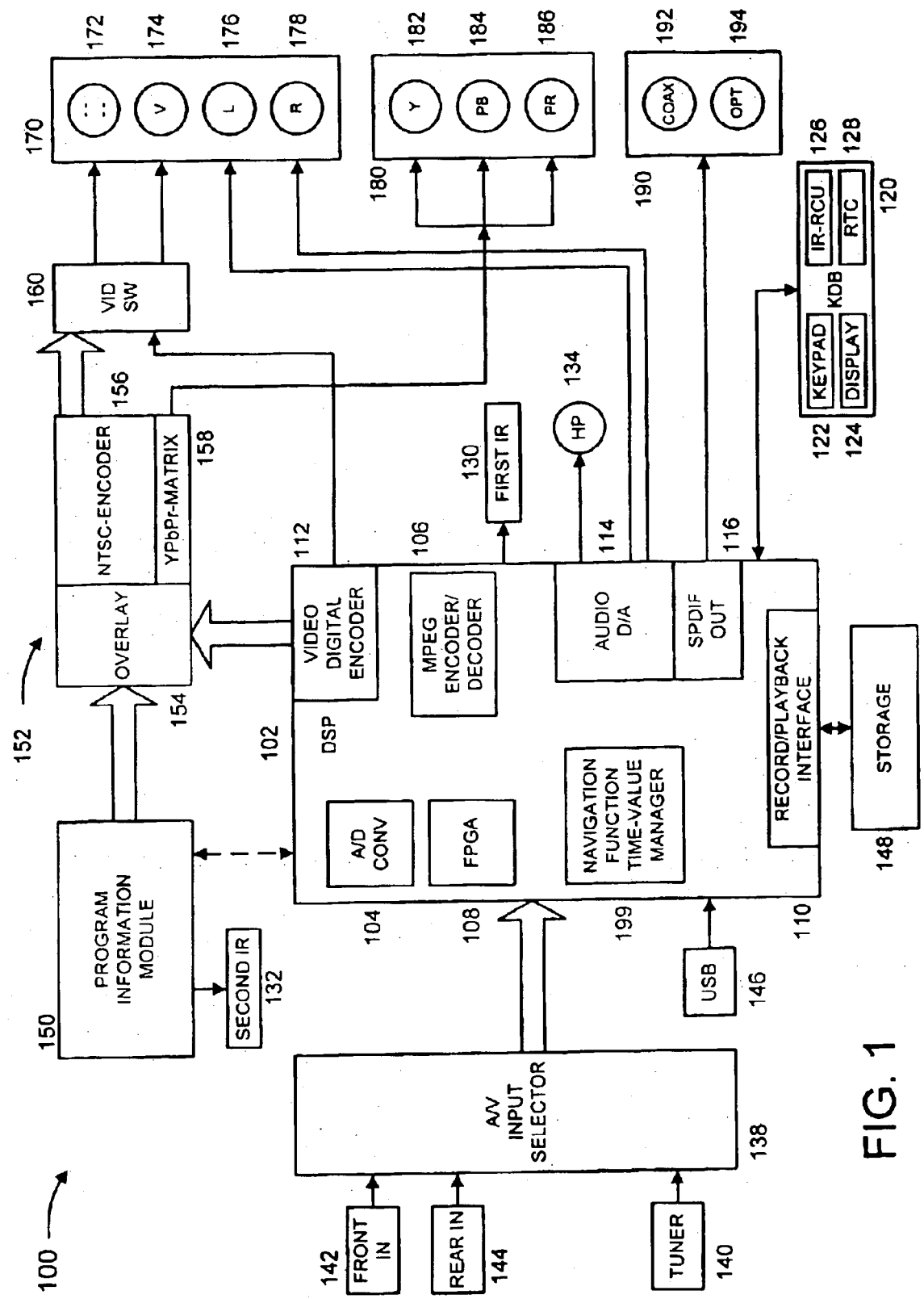
FIG. 1 is a block diagram illustrating a personal video recorder 100, according to an illustrative embodiment of the present invention.

FIG. 1 is a block diagram illustrating a personal video recorder 100, according to an illustrative embodiment of the present invention. The personal video recorder (PVR) 100 can include a digital signal processor (DSP) 102, a key and display board (KDB) 120, a tuner 140, an A/V input selector 138, a USB input 146, a storage device 148, a program information module 150, and a navigation function time-value manager 199. Additionally, the PVR 100 can include first and second infra-red (IR) links 130 and 132, a video overlay encoder 152, a video switch 160, a headphone jack 134, a standard A/V component connector block 170, a YPbPr component connector block 180, and a Sony/Phillips digital interface (SPDIF) connector block 190.

The component connector blocks 170, 180 and 190 can provide audio/video signals in a variety of output formats. For example, the standard A/V component connector block 170 can comprise an S-video connector 172 for outputting to a video display video that has been separated into chrominance and luminance video signals and a composite video connector 174 for providing a standard composite video signal. Further, the standard A/V component connector block 170 can comprise left and right audio output connectors, 176 and 178, respectively.

The YPbPr component connector block 180 is typically used for high definition television (HDTV). The YPbPr component connector block 180 comprises a video luminance (Y) output connector 182 for providing an analog video luminance component, a Pb output connector 184 for providing an analog blue color difference (B-Y), and a Pr output connector 186 for providing an analog red color difference (R-Y). Lastly, the SPDIF component connector block 190 comprises a coaxial output 192 and an optical output 194 for outputting digital audio signals via a coaxial cable or fiber optic cable, respectively.

The key and display board 120 can be provided as a user interface for the PVR 100 and can incorporate a keypad 122, a display 124, an IR remote control interface 126 and a real time clock 128. By using the keypad 122 or the IR remote control interface 126, a user can select functions to be executed by the PVR 100. For example, a user can choose to change channels on the PVR 100 or to perform trick mode playback. The real time clock 128 can keep time, which can be shown by the display 124. The display 124 also can show other information as well, for example a trick mode being executed by the PVR 100, a selected channel being recorded by the PVR 100, or an identifier representative of a presentation being shown on a video display.

First and second IR links 130 and 132 form a set of communication links between satellite and non-satellite applications to help simplify the interface between the audio, video, and data streams. The first IR link 130 can be a communication interface between the DSP 102 and other devices having an IR communication link. Notably, the first IR link 130 can be useful for controlling other devices designed specifically for aired or cable television broadcasts or radio broadcasts using standard program guide information. The first IR link 130 also can enable features to simplify the consumer's interaction between devices. For example, the first IR link 130 can enable one touch program recording, as well as other user conveniences. The second IR link 132 can provide an interface between the program information module 150 and other devices having IR communication links. Significantly, the second IR link 132 can be useful for communicating with devices not requiring a direct connection to DSP 102, for example with a cable reception device, a VCR, and so forth.

The DSP 102 can comprise an analog to digital (A/D) converter 104, an MPEG encoder/decoder 106, a field programmable gate array (FPGA) 108, a record/playback interface 110, a video digital encoder 112, an audio digital to analog converter (audio D/A) 114 and a SPDIF output 116. The DSP 102 can further include one or more data busses enabling the different DSP components to communicate with each other and cooperatively process data. Notably, interrupt requests (IRQS) and direct memory addresses (DMAS) can be utilized to facilitate bus communications and data processing.

Audio/Video (A/V) input selector 138 can include a plurality of A/V inputs. For example, the A/V input selector 138 can incorporate an A/V input to receive A/V signals from tuner 140. The A/V input selector 138 also can receive signals form various other input devices as well. For example, a video camera can send A/V signals to the A/V input selector 138 via front A/V input 142, and a VCR can send A/V signals via rear A/V input 144. Significantly, other A/V devices can be connected to the A/V input selector 138 as well.

The A/V input selector 138 can forward the received A/V signals to DSP 102. The DSP's A/D converter 104 can be used to convert A/V signals received in an analog format to a digital format. A/V signals already in digital format can bypass the analog to digital conversion, for example, digital signals received via a universal serial bus (USB) interface 146.

FPGA 108 can provide processing instructions for data received from the A/V input selector 138 or the USB interface 146, depending on the type of data received. For example, if A/V data is received in an uncompressed form, FPGA 108 can forward the A/V data to MPEG encoder/decoder 106 for MPEG compression prior to being sent to the record/playback interface 110. However, if A/V data is received in an MPEG compressed format, FPGA 108 can forward the A/V data straight to the receive/playback interface 110. In either case the FPGA 108 can provide read/write instructions to the record/playback interface 110, which then can store the A/V data onto storage 148.

MPEG encoder/decoder 106 can perform MPEG compression and decompression on digital A/V signals. For example, MPEG encoder/decoder 106 can receive digital A/V signals from A/D converter 104 or USB interface 146, compress the digital A/V signals using an MPEG format, and forward the compressed digital A/V signals to the receive/playback interface 110. The record/playback interface 110 then can store the compressed digital A/V signals to storage 148.

Storage 148 can include one or more data storage devices. For example, a data storage device can be a magnetic storage medium, such as a hard disk drive (HDD), an optical storage medium, such as a digital video disk (DVD), an electronic storage medium, such as random access memory (RAM), a magneto/optical storage medium, or any combination of storage devices.

During playback the record/playback interface 110 can read A/V data from storage 148. The A/V data then can be forwarded to MPEG encoder/decoder 106 for decompression. After decompression the A/V data can be separated into video and audio signals. The audio signal can be forwarded to SPDIF 116 to be output digitally via coaxial output 192 or optical output 194. The audio signal also can be forwarded to audio D/A converter 114 for D/A conversion. After D/A conversion the audio signal can be output via headphone jack 134 and/or left and right audio outputs 176 and 178.

The video signal can be processed by video digital encoder 112, which can perform D/A conversion on the video signal as well as encode the video signal into a variety formats. For example, the video signal can be encoded into an RGB format, separated into luminance and chrominance (Y+C) signals, or encoded into a composite video signal having a National Television Standards Committee (NTSC)

format. The composite video and the Y+C video signals can be forwarded to video switch 160, while the RGB video signal can be forwarded to the video overlay encoder 152.

The video overlay encoder 152 can include overlay module 154, NTSC video encoder 156, and YPbPr matrix encoder 158. The overlay module 154 can receive program information from a program information module 150 and graphically overlay the program information onto the video signal. The program information module 150 can extract the program information from an on-line program guide or a program guide contained in incoming A/V signals received by the A/V input selector 138 and communicated to the program information module 150 by the DSP 102. The program information can include available programs for each channel as well as program scheduling. Further, for each individual program the program information can include a program identifier, channel information, recording time, program duration, scene data, program credits, and so forth. Other information and graphics may be overlayed onto the video signal as well. For example, a clock, text blocks, user information, menus, icons, pictures, etc. can be overlayed onto the video signal. Typically, information is overlayed onto the video signal when requested by a user or upon some pre-defined event. However, some information, such as a channel identifier, can be continually overlayed over the video signal.

The NTSC video encoder 156 can output the video signal as an NTSC formatted composite video signal, as well as video separated into separate luminance and chrominance signals. The video signals then can be forwarded to the video switch 160. The video switch 160 can be used to select for display either the NTSC encoded video signal or the video signal generated by the video digital encoder 112. Composite video signals from either source can be output via composite video output connector 174, while chrominance and luminance video signals from either source can be output via the S-video output connector 172.

The YPbPr matrix encoder 158 can generate a YPbPr formatted analog video signal. As previously noted, the YPbPr video signal includes a video luminance (Y) component, an analog blue color difference (B-Y), and an analog red color difference (R-Y). The Y component can be output to the Y output connector 182, the (B-Y) difference can be output to the Pb output connector 184 and the (R-Y) difference can be output to the Pr output connector 186.

The navigation function time-value manager 199 is capable of setting and managing time-values for time-based navigation functions of the video recording systems. It is to be appreciated that in some embodiments of the present invention, some or all of the functions performed by the navigation function time-value manager 199 may be subsumed by other elements of the PVR 100. For example, DSP 102 and computer programming code stored in storage device 148 may be used to implement the functions performed by the navigation function time-value manager 199. Moreover, other elements, as readily contemplated by one of ordinary skill in the related art, may be used to implement those functions. Given the teachings of the present invention provided herein, one of ordinary skill in the related art will contemplate these and various other implementations and configurations of the present invention, while maintaining the spirit and scope of the present invention.

Figure 2:
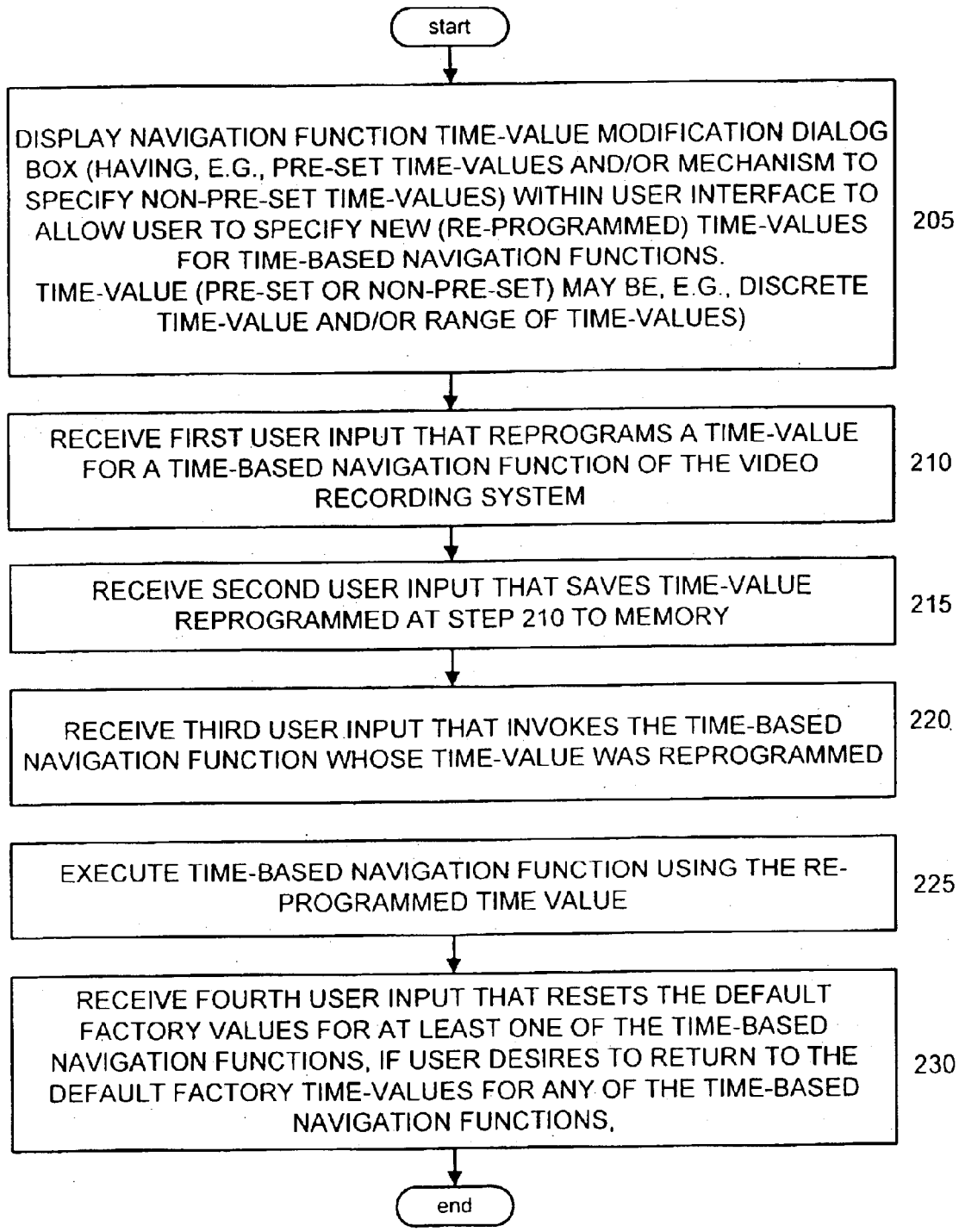
FIG. 2 is a flow diagram illustrating a method for managing time-values of time-based navigation functions in a video recording system, according to an illustrative embodiment of the present invention.

FIG. 2 is a flow diagram illustrating a method for managing time-values of time-based navigation functions in a video recording system, according to an illustrative embodiment of the present invention.

A navigation function time-value modification dialog box is displayed within a user interface of the video recording system (step 205). The navigation function time-value modification dialog box allows a user of the video recording system to specify new time-values for navigation functions that are time-based (i.e., that use a reference time period), such as, but not limited to INSTANT REPLAY and QUICK SKIP. The new time-values would be employed the next time the user invokes any of these navigation functions.

The navigation function time-value modification dialog box may include pre-set time-values for selection by a user and/or a mechanism that allows the user to specify time-values that have not been pre-set. The time-values (e.g., the pre-set time values already provided on the navigation function time-value modification dialog box for selection by the user or the non-pre-set time-values capable of being provided by the user to the navigation function time-value modification dialog box by the mechanism) may be, but are not limited to, discrete time-values and/or ranges of time-values. It is to be appreciated that pre-set time values are those prompted or suggested by the navigation function time-value modification dialog box while the non-pre-set time-values are those provided by the user without prompting or suggestion by the navigation function time-value modification dialog box.

Figure 3:
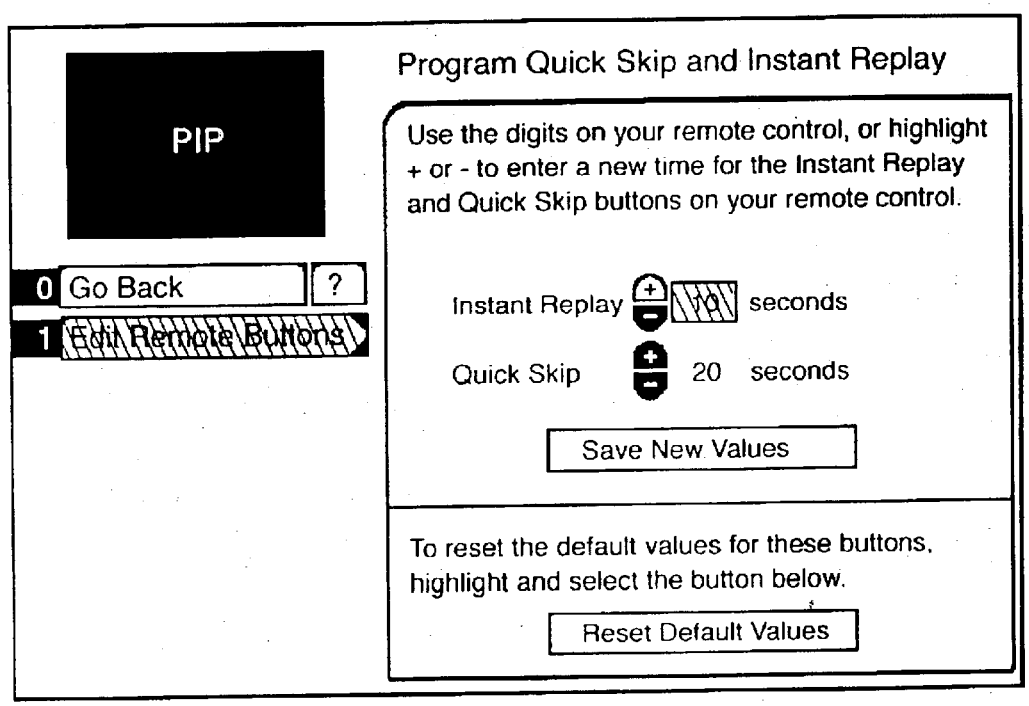
FIG. 3 is a screen shot of a navigation function time-value modification dialog box 300 for a user interface of a video recording system, according to an illustrative embodiment of the present invention.

FIG. 3 is a screen shot of a navigation function time-value modification dialog box 300 for a user interface of a video recording system, according to an illustrative embodiment of the present invention.

A first user input is received that reprograms (sets) a time-value for a time-based navigation function of the video recording system (step 210). The first user input may be provided, for example, via the digit keys on a remote control device for the video recording system, via "+" and "+−" buttons disposed on the navigation function time-value modification dialog box 300, or via some other way as readily contemplated by one of ordinary skill in the related art. Given the teachings of the present invention provided herein, one of ordinary skill in the related art will contemplate these and various other approaches to reprogramming the time-values of time-based navigation functions of a video recording system, while maintaining the spirit and scope of the present invention.

The new time-value may be used, for example, to rewind recorded video by an amount of time equal to the time-value received at step 210 when the user presses the INSTANT REPLAY button on the remote control device, to fast forward over recorded video by an amount equal to the time-value received at step 210 when the user presses the QUICK SKIP button on the remote control, and so forth.

A second user input is received that saves the time-value reprogrammed at step 210 to memory (step 215). With respect to the navigation function time-value modification dialog box 300 shown in FIG. 3, the "Save New Values" button is actuated to save the new time-value.

A third user input is received that invokes the time-based navigation function whose time-value was reprogrammed (step 220). The time-based navigation function is executed using the re-programmed time-value (step 225).

If the user desires to return to the default factory time-value for any of the time-based navigation functions, then a fourth user input is received that resets the default factory values for at least one of the time-based navigation functions (step 230). With respect to the navigation function time-value modification dialog box 300 shown in FIG. 3, the corresponding function (INSTANT REPLAY and/or QUICK SKIP) is highlighted and the "Reset Default Values" button is actuated to restore the default factory time-value.

It is to be appreciated that while the present invention is described herein with respect to menus, dialog boxes, and so forth, the present invention is not limited to these display structures (also referred to as "user interface elements") and, thus, other structures and the like as readily contemplated by one of ordinary skill in the related art may be employed in implementations of the present invention, while maintaining the spirit and scope of the present invention. The other structures may be, e.g., other display structures (e.g., banners, menus, dialog, boxes, etc.), hardware structures (e.g., switches, buttons, sliders, etc.), and so forth.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for managing time-values of time-based navigation functions in a video recording system, comprising the steps of:

receiving a user input that specifies a re-programmed time-value for a time-based navigation function; and storing the re-programmed time-value for future use with the time-based navigation function.

2. The method of claim 1, further comprising the step of providing a user of the video recording system with a plurality of pre-set time-values from which to select the user input.

3. The method of claim 1, further comprising the step of displaying a user interface element having a plurality of pre-set time-values specified thereon for selection by a user, the plurality of pre-set time-values for use with the time-based navigation function.

4. The method of claim 1, further comprising the step of providing a user of the video recording system with a plurality of pre-set ranges of time-values from which to select the user input.

5. The method of claim 1, further comprising the step of displaying a user interface element having a plurality of pre-set ranges of time-values specified thereon for selection by a user, the plurality of pre-set ranges of time-values for use with the time-based navigation function.

6. The method of claim 1, wherein the time-based navigation function is one of instant replay and quick skip.

7. The method of claim 1, further comprising the steps of:

receiving another user input that invokes the time-based navigation function; and executing the time-based navigation function using the re-programmed time-value specified by the user input.

8. An apparatus for managing time-values of time-based navigation functions in a video recording system, comprising:

a navigation function time-value manager for receiving a user input that specifies a re-programmed time-value for a time-based navigation function; and a memory device for storing the re-programmed time-value for future use with the time-based navigation function.

9. The apparatus of claim 8, further comprising a user interface element for providing a user of the video recording system with a plurality of pre-set time-values from which to select the user input.

10. The apparatus of claim 8, further comprising a user interface element for providing a user of the video recording system with a plurality of pre-set ranges of time-values from which to select the user input.

11. The apparatus of claim 8, wherein the time-based navigation function is one of instant replay and quick skip.

12. The apparatus of claim 8, wherein said navigation function time-value manager receives another user input that invokes the time-based navigation function, and said video recording system further comprises a processor for executing the time-based navigation function using the re-programmed time-value specified by the user input.

13. The apparatus of claim 12, wherein said processor comprises at least a portion of said navigation function time-value manager.

14. The apparatus of claim 12, wherein said navigation function time-value manager comprises said processor.

15. A method for managing time-values of time-based navigation functions in a video recording system, comprising the steps of:

receiving a user input that specifies a re-programmed time-value for a time-based navigation function; and executing the time-based navigation function using the re-programmed time-value specified by the user input.

16. The method of claim 15, further comprising the step of providing a user of the video recording system with a plurality of pre-set time-values from which to select the user input.

17. The method of claim 15, further comprising the step of displaying a user interface element having a plurality of pre-set time-values specified thereon for selection by a user, the plurality of pre-set time-values for use with the time-based navigation function.

18. The method of claim 15, further comprising the step of providing a user of the video recording system with a plurality of pre-set ranges of time-values from which to select the user input.

19. The method of claim 15, further comprising the step of displaying a user interface element having a plurality of pre-set ranges of time-values specified thereon for selection by a user, the plurality of pre-set ranges of time-values for use with the time-based navigation function.

20. The method of claim 15, wherein the time-based navigation function is one of instant replay and quick skip.

* * * * *